United States Patent
Pettypiece, Jr.

(10) Patent No.: US 6,840,539 B2
(45) Date of Patent: Jan. 11, 2005

(54) AIRBAG AND A DEPLOYMENT SENSOR

(75) Inventor: Robert P. Pettypiece, Jr., Lakeland, FL (US)

(73) Assignee: Key Safety Systems, Inc., Sterling Heights, MI (US)

(*) Notice: Subject to any disclaimer, the term of this patent is extended or adjusted under 35 U.S.C. 154(b) by 170 days.

(21) Appl. No.: 10/369,697

(22) Filed: Feb. 21, 2003

(65) Prior Publication Data

US 2004/0164533 A1 Aug. 26, 2004

(51) Int. Cl.$^7$ .......................... B60R 21/32; B60R 21/16
(52) U.S. Cl. ................................. 280/735; 280/743.2
(58) Field of Search ........................... 280/735, 743.2, 280/743.1

(56) References Cited

U.S. PATENT DOCUMENTS

| | | | | |
|---|---|---|---|---|
| 4,402,470 | A | * 9/1983 | Hamayasu | 242/286 |
| 5,762,367 | A | 6/1998 | Wolanin | |
| 5,957,490 | A | * 9/1999 | Sinnhuber | 280/743.2 |
| 6,129,379 | A | 10/2000 | Specht | 280/735 |
| 6,189,928 | B1 | * 2/2001 | Sommer et al. | 280/743.2 |
| 6,250,677 | B1 | * 6/2001 | Fujimura | 280/743.2 |
| 6,308,983 | B1 | * 10/2001 | Sinnhuber | 280/735 |
| 2004/0084883 | A1 | * 5/2004 | Gioutsos et al. | 280/739 |
| 2004/0119273 | A1 | * 6/2004 | Husby et al. | 280/743.2 |
| 2004/0155445 | A1 | * 8/2004 | Husby | 280/743.2 |

FOREIGN PATENT DOCUMENTS

| | | | | |
|---|---|---|---|---|
| DE | 19611384 | A | * 9/1997 | B60R/21/26 |
| EP | 0812741 | A | * 12/1997 | B60R/21/32 |
| EP | 0943499 | A | 9/1999 | |
| EP | 0990567 | A1 | 9/1999 | |
| EP | 0990567 | A | 4/2000 | |

OTHER PUBLICATIONS

Pending unpublished U.S. Appl. No. 10/321,524 filed Dec. 18, 2002 by Husby et al. for Airbag deployment velocity sensor.
Pending unpublished U.S. Appl. No. 10/359,257 filed Feb. 6, 2003 by Husby for Airbag deployment rate sensor with spool brake.

* cited by examiner

*Primary Examiner*—David R. Dunn
*Assistant Examiner*—Joselynn Y. Sliteris
(74) *Attorney, Agent, or Firm*—Lonnie Drayer; Patrick Stiennon

(57) ABSTRACT

A cartridge stores a quantity of string, one end of which is attached to the inside surface of an airbag cushion. A spool which transitions to a cone is situated within the cartridge. A narrow gap around the spool forms a string storage space and a similar gap overlies the cone and leads to an outlet. Positioned within the body of the cartridge is a light source and a light detector. As string is drawn out of the cartridge, the string traverses between the light sources and a light detector generating a signal directly proportional to the rate at which string is withdrawn. The geometry of the cartridge is arranged to provide friction against the string. The friction is created between the string and the junction between the cylindrical spool and the cone and rapidly overcomes the momentum of the string when the airbag cushion comes to a stop.

33 Claims, 5 Drawing Sheets

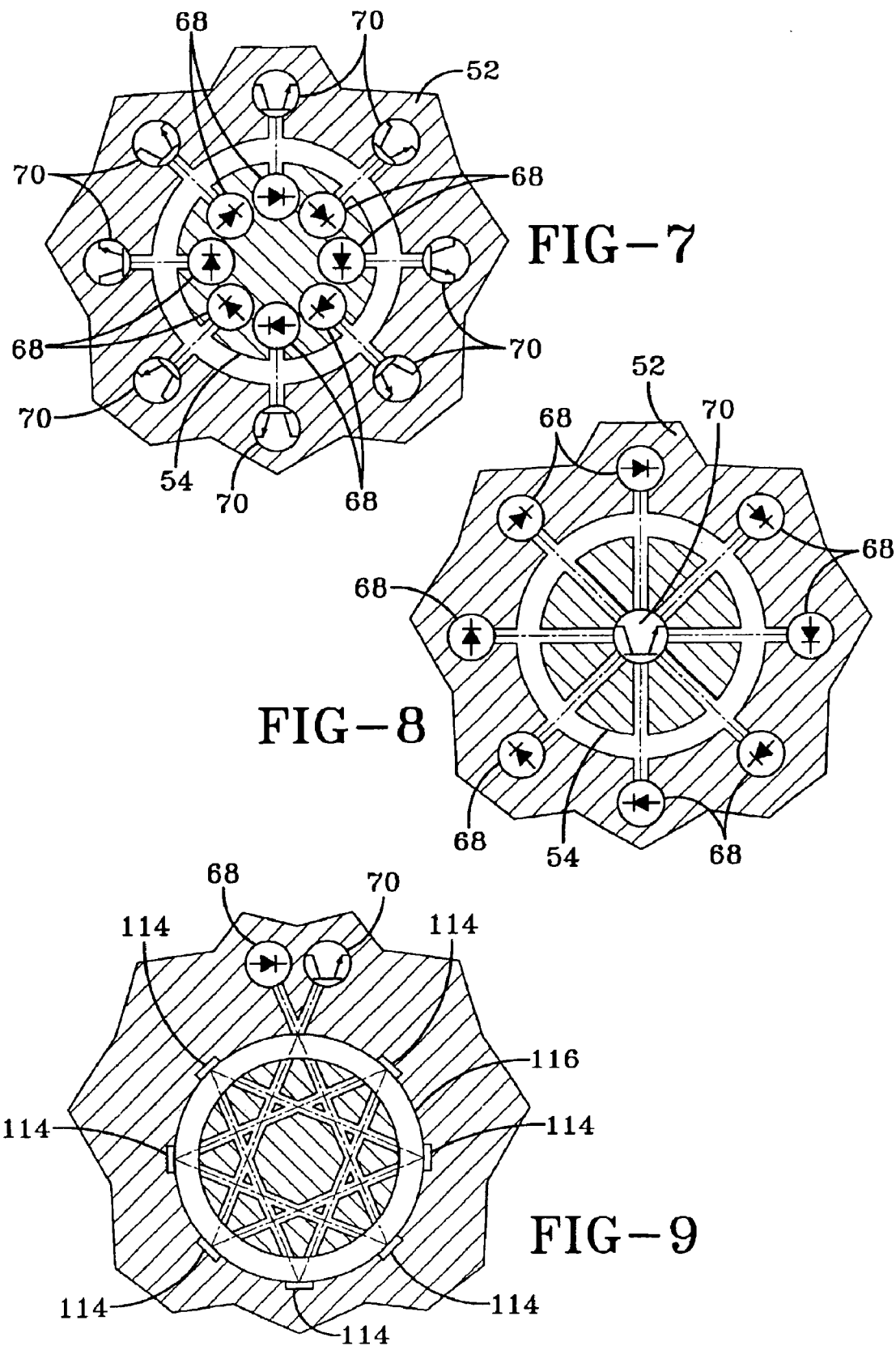

AIRBAG AND A DEPLOYMENT SENSOR

FIELD OF THE INVENTION

The present invention relates to airbags and sensors used to control airbag deployment, and to sensors that monitor the actual deployment sequence in particular.

BACKGROUND OF THE INVENTION

While airbags were originally developed as a passive restraint system, experience has shown that airbags work best in combination with seatbelts and other safety systems. Although airbags contribute to the overall safety of occupants of an automobile, they can present a danger to an occupant who is positioned too close to an airbag when it deploys. This condition, where the occupant is positioned so that airbag deployment might be dangerous, is referred to as the occupant being "out of position." Various systems have been developed to detect an "out of position" occupant. Sensor systems designed to detect the occupant's position often require constant monitoring so that in the event of a crash the occupant's position is known. Sensor systems designed to detect the position of the occupant have been proposed based on ultrasound, optical, or capacitance sensors. Constant monitoring of sensors, which may have high data rates, requires the design of algorithms which can reduce sensor data to a single condition or a limited number of data conditions which are used in an airbag deployment decision to prevent airbag deployment or for a duel stage airbag to select the level of deployment. Maintaining data integrity between the non-crash positional data, and positional data needed during airbag deployment is complicated by the noisy environment produced by a crash. Dealing with data integrity issues requires increased processor capabilities and algorithm development, which also requires additional testing.

Prior art approaches attempt to determine, based on various sensors, the distance between the airbag and the passenger before the airbag is deployed. In many instances, the vehicle occupant will not be too close to the airbag at the time the decision to deploy the airbag is made, but, because of the rate at which the occupant is approaching the airbag, the occupant will be too close when the airbag is actually deploying. To handle these situations, more sophisticated sensors and algorithms are needed to attempt to predict the occupant's position when the airbag is actually deployed or nearly completely deployed. In other words, the ideal airbag deployment system functions such that the airbag deploys fully or nearly fully before the occupant engages the airbag. Existing systems inhibit airbag deployment when, based on various sensors and algorithms, it is determined that, because of the position of the vehicle occupant, the bag is more likely to harm than to benefit the occupant.

Successfully creating a sensor and algorithm system is complicated because there is usually very little delay between the decision to deploy and actual deployment. This is so because the maximum benefit from an airbag is achieved by early deployment, and at the same time, more time before deployment maximizes the information available to determine whether deployment is necessary. The desire to maximize effective deployment of the airbag while minimizing unnecessary deployment creates a tension between waiting for more information and deploying immediately. Therefore, once sufficient information is available, deployment typically follows nearly immediately.

Therefore, a system which employs occupant position sensors and algorithms must be able to supply at all times an indication of whether airbag deployment should be inhibited so that the inhibit decision can be applied whenever the airbag deployment decision occurs. This means the sensors and algorithms used to develop the occupant position inhibit signal cannot be optimized to deal with a specific time frame in which the actual deployment decision is made. The end result is that such algorithms may be less accurate than desired because they must predict events relatively far in the future—perhaps tens of milliseconds.

DISCUSSION OF THE PRIOR ART

One known type of sensor shown in European application EP 0990567A1 employs a plurality of tapes that extend between the front of the airbag and a tape dispensing cartridge mounted on the airbag housing. Tape extraction sensors within the cartridge monitor the rate at which tape is withdrawn from the cartridge and thus can detect airbag impact with an occupant by a decrease in airbag velocity. Improvements are needed to the known tape cartridges to improve the functionality and reliability of the tape type bag deployment monitoring sensors.

SUMMARY OF THE INVENTION

The airbag deployment sensor of this invention employs a cartridge that stores a quantity of string. One end of the string stored in the cartridge is attached to the inside surface of an airbag cushion. As the string is withdrawn from the cartridge it is caused to repeatedly move in front of one or more sensors so the rate at which string is being withdrawn from the cartridge can be determined. The geometry of the cartridge is arranged to provide a controlled amount of friction on the string. The friction in the cartridge is selected so as to rapidly overcome the momentum of the string when the portion of the airbag cushion to which the string is attached comes to a stop. A preferred embodiment has an axisymmetric cylindrical spool which transitions to a cone situated within the cartridge. A narrow gap around the cylindrical spool defines a string storage space and a similar gap overlying the cone and leading to an outlet overlying the apex of the cone defines a payout structure. The cone is penetrated by a plurality of holes which cross an axis defined by the cylindrical spool and the co-joined cone. Positioned within the body of the cartridge opposite one side of each hole in the cone is a light source. Positioned within the body of the cartridge opposite a second side of each hole is a light detector. As string is drawn out of the cartridge by deployment of the airbag, the string traverses between the light sources and the light detectors so that a signal with twice the frequency of the number of holes in the cone is generated each time a loop of string is withdrawn from the cartridge. The signal frequency is directly proportional to the rate at which string is withdrawn and provides a direct measurement of the forward velocity of the portion of the airbag cushion to which the string is attached. Friction to overcome the momentum of the deployed string is created between the string and the junction between the cylindrical spool and the cone.

An alternative embodiment utilizes an elliptical or oval prismatic spool with or without a conical extension. A further embodiment utilizes two prismatic spools about which the string is wound in a figure-eight pattern.

It is a feature of the present invention to provide an airbag deployment sensor which can detect a portion of the airbag cushion impacting an object before the cushion is fully deployed.

It is a further feature of the present invention to provide an airbag deployment sensor which utilizes the payout of string to measure the speed of a portion of an airbag wherein the string deployment cartridge has no moving parts.

It is a still further feature of the present invention to provide an airbag deployment sensor which utilizes the payout of string to measure the speed of a portion of an airbag wherein the fractional resistance to drawing string from a deployment cartridge is simply controlled in design.

It is yet another feature of the present invention to provide an airbag deployment sensor incorporating a string deployment cartridge wherein no marks are required on the string.

Further features and advantages of the invention will be apparent from the following detailed description when taken in conjunction with the accompanying drawings.

BRIEF DESCRIPTION OF THE DRAWINGS

FIG. 7 is a schematic top plan view of an another alternative arrangement of the light sources and light detectors that could be used with the airbag deployment sensor of FIG. 1.

FIG. 8 is a schematic top plan view of a further alternative arrangement of the light sources and light detectors which could be used with the airbag deployment sensor of FIG. 1.

FIG. 9 is a schematic top plan view of a yet further alternative arrangement of the light sources and light detectors which could be used with the airbag deployment sensor of FIG. 1.

DETAILED DESCRIPTION OF THE INVENTION

Figure 1:
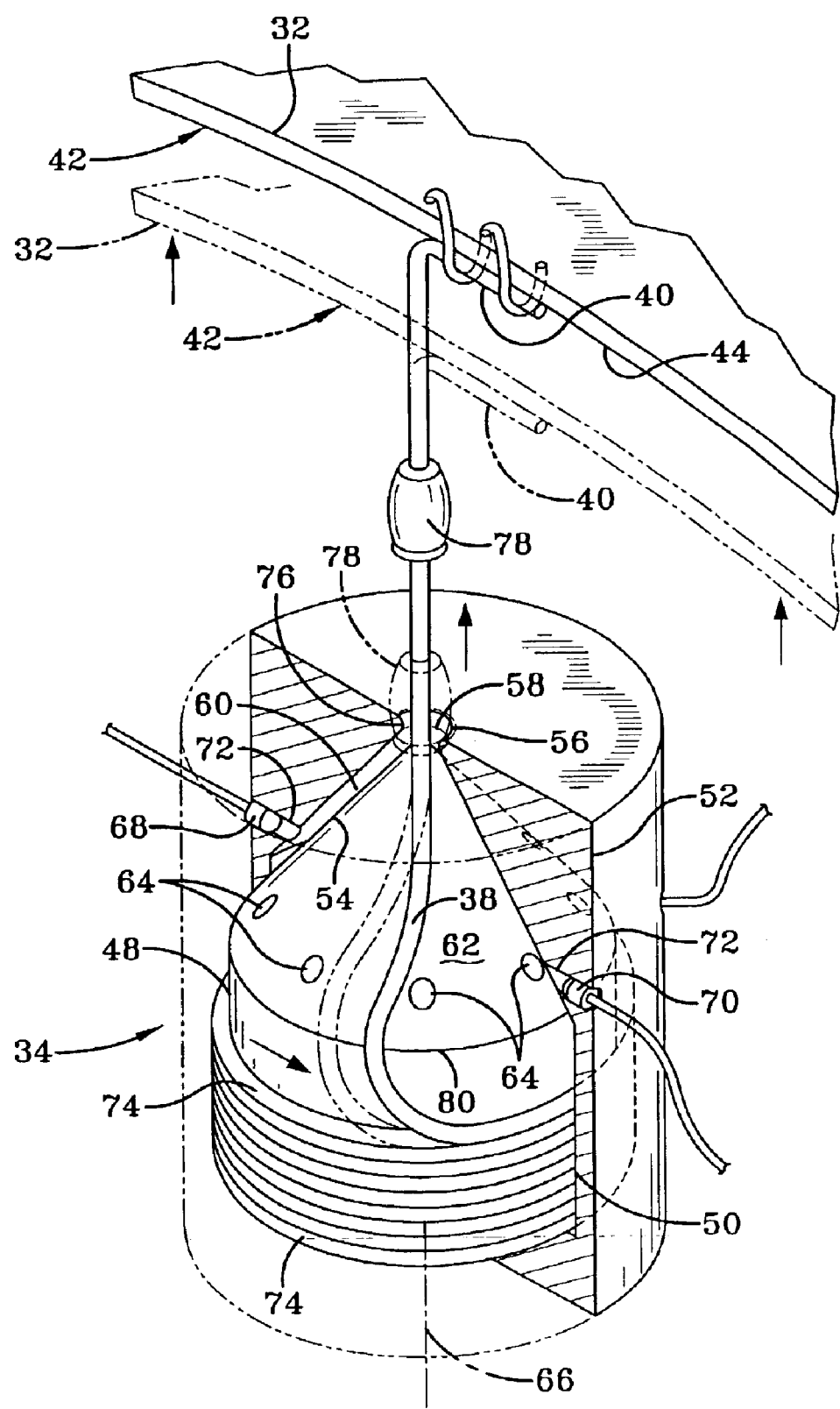
FIG. 1 is an isometric view partially cut-away in section of the airbag deployment sensor of this invention.
Figure 2:
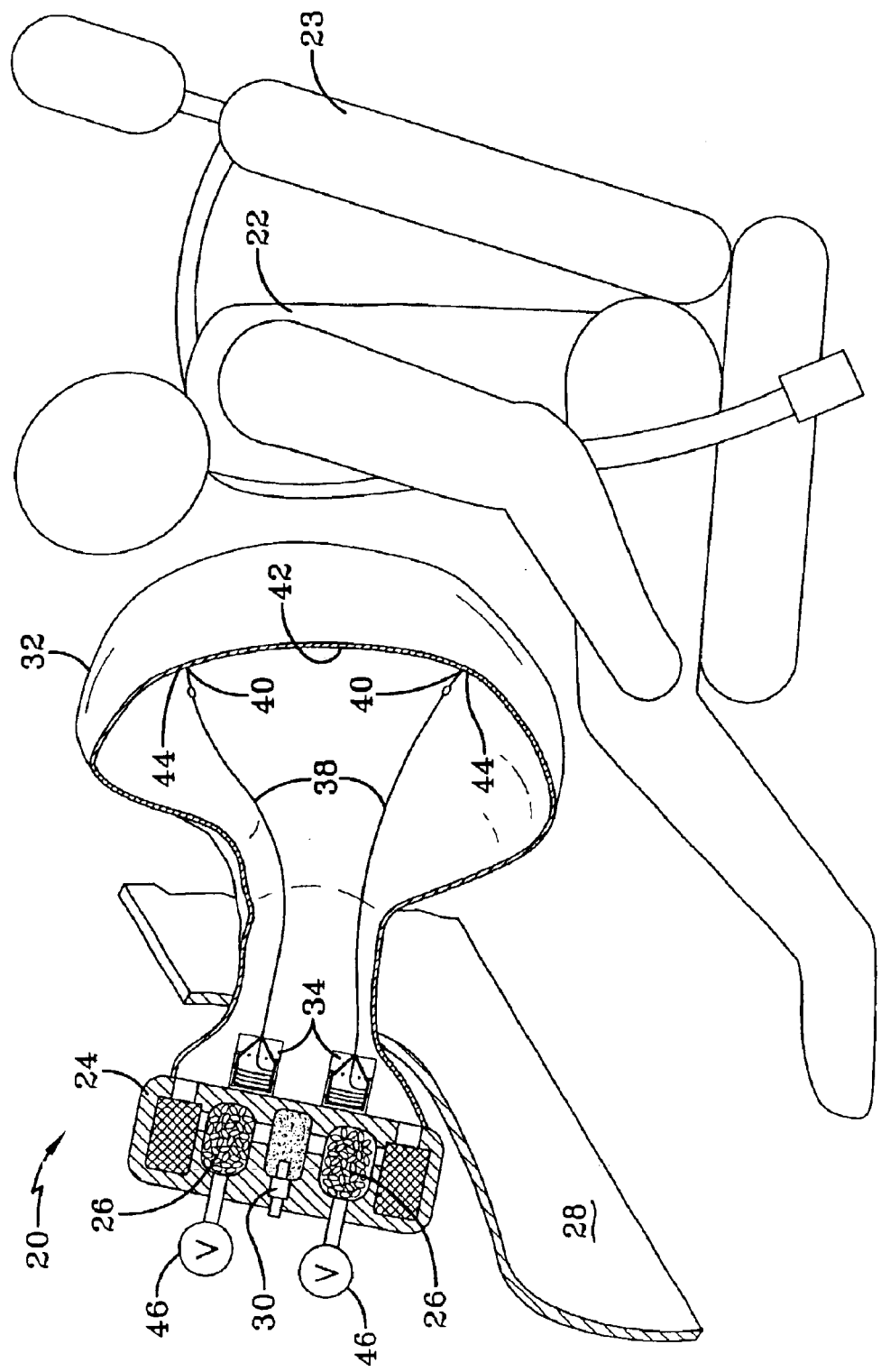
FIG. 2 is a side elevational view partly cutaway of the airbag deployment sensor of FIG. 1 positioned to detect the rate of deployment of an airbag cushion.

Referring more particularly to FIGS. 1–9, wherein like numbers refer to similar parts, an airbag module 20 is shown in FIG. 2. The airbag module 20 is positioned opposite a vehicle passenger 22 seated on a vehicle seat 23. A housing 24 containing a quantity of gas generant 26 is positioned behind an instrument panel 28. When activated by an igniter 30, the gas generant 26 inflates an airbag cushion 32 that extends through the instrument panel 28 towards the passenger 22. A plurality of airbag deployment sensors 34 are mounted to the housing 24.

Each sensor 34, as shown in FIG. 1, has a cartridge 36 that contains a quantity of string 38. As used herein and in the claims the term "string" is understood to mean an elongated flexible member having a cross section of any suitable shape, not just circular, including for example rectangular or oblong. One end 40 of the string 38 is attached to the inside surface 42 on the airbag cushion 32. As the airbag cushion 32 is deployed towards the passenger 22, string 38 is drawn from the cartridge 36. By monitoring the rate at which string 38 is withdrawn from the cartridge 36 it is possible to detect when a portion 44 of the airbag cushion 32 impacts an object because, as the portion 44 of the airbag comes to a stop, it ceases to draw string 38 from the cartridge 36. This information can be used by a safety system controller (not shown) to control valves 46 on the housing 24 to vent the airbag cushion 32 or to otherwise limit or control the continued inflation of the cushion 32.

As shown in FIG. 1, the airbag deployment sensor 34 has a cartridge 36 within which is contained a cylindrical spool 48 about which the string 38 is wound. A gap 50 between the spool 48 and the body 52 of the cartridge 36 forms a reservoir for the storage of the string. Typically about three feet of string will be stored within the cartridge 36 before the airbag cushion deployment begins. The cylindrical spool 48 is topped by a cone 54 that tapers towards an apex 56. The gap 50 forming the string reservoir continues to follow the cone 54 until it reaches an opening 58 positioned over the apex 56 of the cone 54. The gap over the cone forms a passageway 60 through which the string 38 moves in reaching the opening 58.

The arrangement of the cylindrical spool 48 and the cone 54 is such that the string sweeps along the surface 62 of the cone 54 as it is pulled from the reservoir formed by the gap 50 about the cylindrical spool 48. The cone 54 is formed with a plurality of holes 64 that are perpendicular to an axis 66 defined by the cylindrical spool 48 and the cone 54. The holes 64 in the cone 54 are aligned to allow light from a light source 68 such as an LED to be transmitted through the cone 54 to a light sensor 70 such as a phototransistor positioned opposite the light source 68.

As shown in FIG. 1, the light sources and light sensors are mounted within the cartridge body 52 within collimating sockets 72. As the string 38 is withdrawn from the cartridge 36 and thus rotates, as illustrated in FIG. 1, along the surface 62 it twice passes between any particular light source 68 and light sensor 70 momentarily completely or partially blocking the reception of light by the light sensor 70. If there are four pairs of light sources 68 and light sensors 70 as shown in FIG. 1, each time a coil 74 of string 38 is withdrawn from the cartridge 36 the string will pass once completely around the surface 62 of the cone 54 causing eight interruptions of light passing from a light source to a light sensor. Thus the movement of the string 38 creates a periodicity which is proportional to the length of string withdrawn.

If the cylindrical spool has a diameter, for example of 1.9 centimeters (¾ inch), one coil 74 would have a length of about 5.9 centimeters (2⅓ inches) and removal of about every 0.8 centimeters (⅓ inch) of string would be detected, if four sensors and light sources are used as shown in FIG. 1. By increasing the number of light sources and light sensors, a more precise and higher frequency signal can be generated by the withdrawal of string 38 from the cartridge 36.

The string 38 moves through the opening 58 which has a rounded outlet lip 76 to prevent binding, as the airbag cushion motion during deployment may cause the string 38 to be pulled from varying directions, especially during the early phases of airbag cushion deployment when cushion flutter may be experienced.

To hermetically seal the cartridge 36 during the storage life of the airbag 20, a plug 78 attached to the string 38 may be used to seal the opening 58. The plug 76 is pulled away from the opening 58, as illustrated in FIG. 1. As the string 38 is drawn from the cartridge 36, the string rubs on the cylindrical edge 80 where the string transitions from being pulled upwardly along the cylindrical spool 48 to being pulled along the cone 54. This rubbing will produce a frictional force, which will retard the withdrawal of the string 38. The frictional force losses, act as a brake to overcome the momentum of the string already withdrawn so that when the portion 44 of the airbag to which the string is connected comes to a stop, the rate at which string is withdrawn from the cartridge 36 will rapidly reflect the velocity of the airbag portion 44 to which the string is attached. By adjusting the height of the cone 54, the angle at which the string is drawn over the cylindrical edge can be adjusted, which should control the amount of friction experienced by the string 38.

The string 38 may be woven of a single filament or of a twisted strand of fibers, selected from fibers such as high-strength & high-modulus polyethylene fiber (HSM-PE fiber) or an aromatic (polyamide) fiber. A sizing such as wax may be applied to the string 38 to prevent tangling as the string is withdrawn from the storage reservoir, and to hold the string within the gap 50 allowing only a single coil 74 to be withdrawn at one time. The second end (not shown) of the string may be attached to the body 52 of the cartridge 36.

Figure 3:
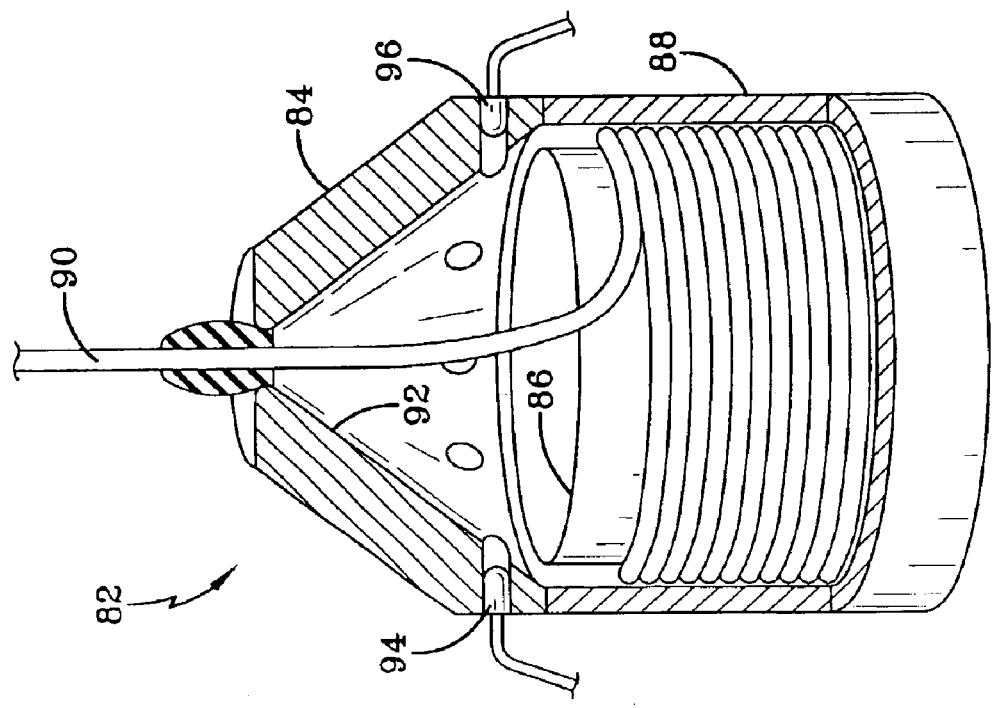
FIG. 3 is a side elevational view, partially cut-away in section, of an alternative embodiment of the airbag deployment sensor of this invention.

An alternative embodiment of an airbag deployment sensor 82 is shown in FIG. 3. The airbag deployment sensor 82 has a cartridge 84 with an elliptical or oval spool 86. A string storage reservoir is defined by a gap between the oval spool 86 and the body 88 of the cartridge 84. String 90 is wound about the spool 86. Portions 92 of the cartridge 84 form the elliptical or oval conical space through which the string 90 is drawn. Light sources 94 and light sensors 96 are positioned about the conical space such that pulling the string 90 results in the string passing back and forth between the light sensors 96 and light sources 94.

Figure 4:
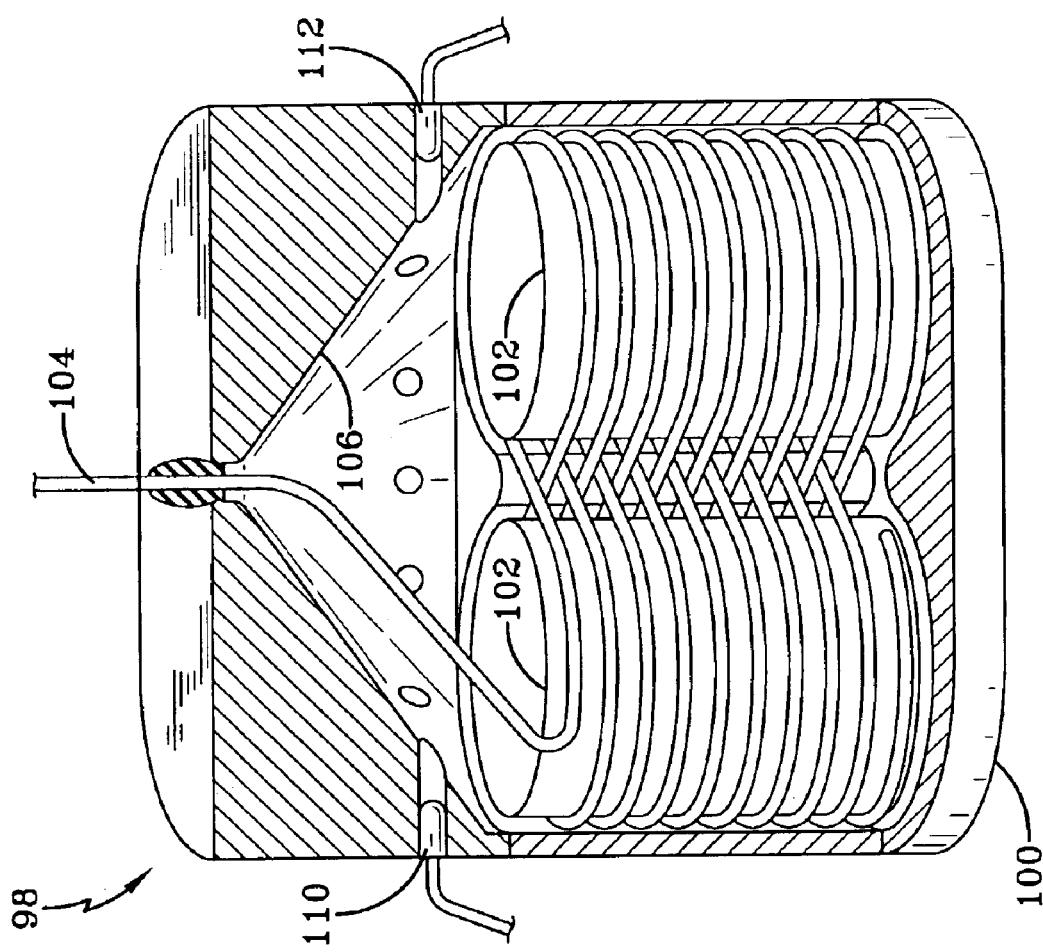
FIG. 4 is a side elevational view, partially cut-away in section, of another alternative embodiment of the airbag deployment sensor of this invention.

A further embodiment of an airbag deployment sensor 98 is shown in FIG. 4. The deployment sensor 98 has a cartridge 100 and two elliptical- or tear-shaped right prismatic spools 102 about which a string 104 is wound in a figure eight pattern. Portions 106 of the cartridge 100 form the oval conical space through which string 108 is drawn. Light sources 110 and light sensors 112 are positioned about the conical space such that pulling string 104 from the cartridge 100 results in the string passing back and forth between light sensors 112 and light sources 110.

Figure 5:
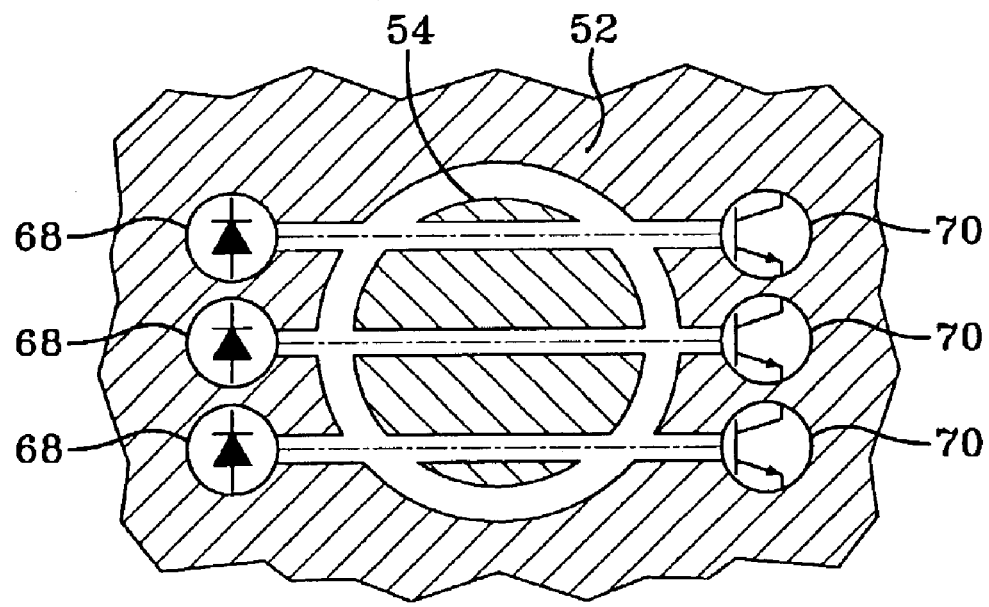
FIG. 5 is a schematic top plan view of an alternative arrangement of the light sources and light detectors that could be used with the airbag deployment sensor of FIG. 1.

The light sensors 70 and light sources 68 illustrated in FIG. 1 could be arranged in various ways. FIG. 5 illustrates three LEDs positioned opposite three photo transistors arranged in a linear array. FIG. 7 illustrates eight separate LEDs 68 positioned in the cone 54 that passes light to eight separate phototransistors 70. FIG. 8 shows an arrangement opposite the one shown in FIG. 7, with a single photodiode 70 mounted in the cone 54 receiving light from eight LEDs mounted in the body 52 of the cartridge 36. The arrangement of FIG. 8 has the advantage of a single light detector which produces a single higher frequency output signal which does not need to be created by adding the output of multiple light sensors.

FIG. 9 illustrates the use of mirrors 114 so that a single light source 68 such as a diode laser can make multiple passes through the space 116 through which the string is drawn before reaching a light sensor 70. The arrangement of FIG. 9 also provides simplified electronics, because only a single sensor is used. Using a single sensor avoids the additional electronics associated with adding the output of multiple sensors together to get a single signal indicative of the speed with which string is withdrawn from the cartridge.

Figure 6:
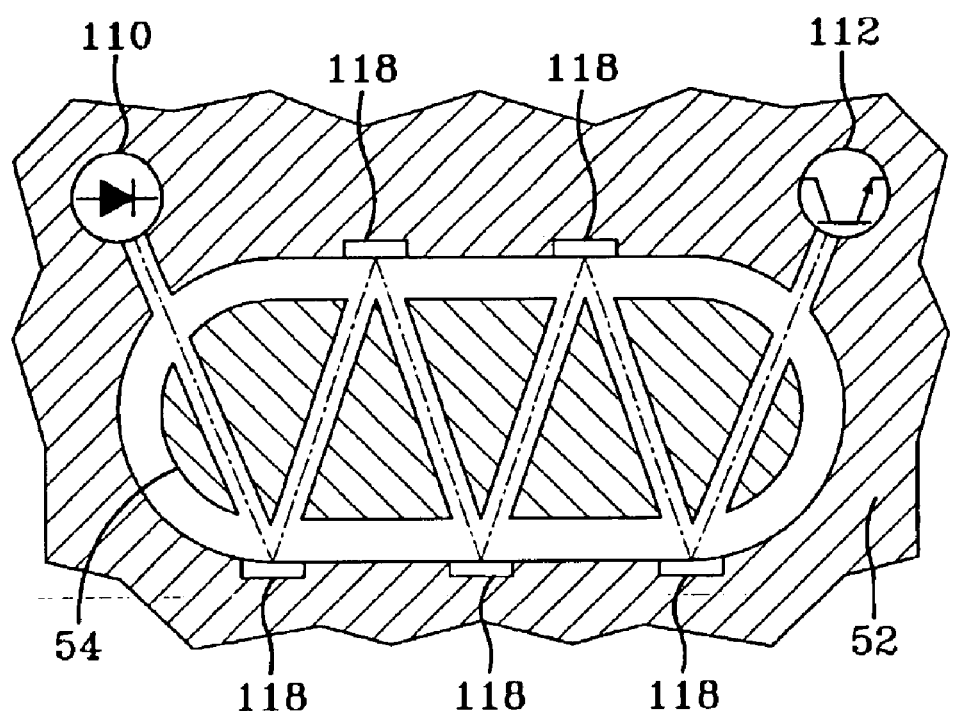
FIG. 6 is a schematic top plan view of arrangement of light sources and light detectors for use with the airbag deployment sensors of FIGS. 3 and 4.

FIG. 6 shows an alternative arrangement of a single light source 110 such as a diode laser and mirrors 118 which makes multiple passes across a conical space before reaching a light detector 112 which is suitable for use with the airbag deployment sensor 98 shown in FIG. 4. Again, the use of a single sensor simplifies the detecting electronics.

It should be understood that the string 38, 90, 104 can be a single filament or woven fiber or a tape, and will preferably be made of high strength lightweight material, for example high-strength & high-modulus polyethylene fiber (HSM-PE fiber) or an aromatic (polyamide) fiber. The string may be coated with a size such as wax to facilitate the orderly withdrawal from the cartridge, the size holding the string in place within the string reservoir until the pulling action of the airbag cushion causes the string to peel away from the string remaining in the reservoir. The size selected may also be used to control the amount of breaking friction by selecting a size that increases or decreases withdrawal friction as necessary. It should be understood that this string can be directly attached to the airbag cushion interior surface, or could be attached indirectly by way of a string, tape or web which is attached to the airbag cushion interior surface.

As the string is withdrawn from the cartridge, the string emerging from the cartridge opening defines a direction of string motion toward the airbag attachment point, even though in practice due to airbag flutter the airbag string will at times be pulled in a range of directions which on average defines the string motion.

It is understood that the invention is not limited to the particular construction and arrangement of parts herein illustrated and described, but embraces all such modified forms thereof as come within the scope of the following claims.

I claim:

1. An airbag and a deployment sensor comprising:
   an airbag cushion, defining a cushion interior having an inside surface;
   a structure to which the airbag cushion is attached;
   a sensor mounted to the structure, and mounted internal to the airbag cushion, the sensor further comprising:
   a cartridge having portions defining a storage space within the cartridge, the storage space containing a quantity of string, the cartridge having portions forming a string outlet, wherein one end of the string is attached to a portion of the inside surface of the airbag cushion, so that deployment of the airbag cushion draws string out of the storage space in the cartridge, through the string outlet, and the string leaving the string outlet defines a direction of string withdrawal;
   a structure positioned within the cartridge to cause string drawn out of the storage space to move transverse to the direction of string withdrawal, wherein the transverse motion caused has a periodicity which is proportional to the length of string withdrawn;
   at least one string sensor positioned in the cartridge between the storage space and the string outlet, the at least one string sensor positioned to detect the transverse motion of the string, so that the sensor output varies with a frequency proportional to the rate string is withdrawn from the cartridge.

2. The airbag and a deployment sensor of claim 1 wherein the structure positioned within the cartridge is arranged to cause frictional engagement with the string, sufficient to overcome the momentum of the string.

3. The airbag and a deployment sensor of claim 1 wherein the storage space is defined by a gap between at least one spool and portions of the cartridge, and wherein the string is contained in the storage space by being wound around the spool.

4. The airbag and a deployment sensor of claim 3 wherein the spool has an upper edge over which the string is drawn, the upper edge being positioned to cause frictional engagement with the string, sufficient to overcome the momentum of the string.

5. The airbag and a deployment sensor of claim 3 wherein the at least one spool has a cylindrical shape and a cone extending from the spool, and wherein the string outlet is positioned above the cone, so that as string is drawn out of the outlet it rotates about the cone creating the transverse motion.

6. The airbag and a deployment sensor of claim 5 wherein the at least one string sensor is comprised of a light source and a light detector positioned so that as the string is drawn out of the outlet and rotates about the cone it periodically passes between the light source and the light detector.

7. The airbag and a deployment sensor of claim 6 wherein a plurality of light sources are mounted within the cone and portions of the cone define openings which project light onto a plurality of light sensors mounted in second portions of the cartridge defining openings opposite the light sources.

8. The airbag and a deployment sensor of claim 6 wherein a light path is established by means of reflectors between the light source and the light sensor so that as the string travels once about the cone, the light path is interrupted a plurality of times.

9. The airbag and a deployment sensor of claim 3 wherein there are two spools and the string is wrapped in a figure-eight pattern around both spools.

10. The airbag and a deployment sensor of claim 1 wherein the at least one string sensor is comprised of a light source, and a light detector positioned so that as the string is drawn out of the outlet and caused to move transverse to the direction of string withdrawal, the transverse motion causes a light path between the light source, and the light detector to be broken.

11. The airbag and a deployment sensor of claim 10 wherein the light path is established by means of reflectors between the light source and the light sensor so that as the string moves transverse to the direction of string withdrawal, the light path is interrupted a plurality of times for each cycle of transverse motion.

12. An airbag cushion deployment sensor comprising:
a cartridge having portions which define a storage space within the cartridge, the storage space containing a quantity of string, arranged in coils stacked one upon another, the cartridge having portions forming a string outlet positioned above the storage space so that when the string is withdrawn from the string outlet, string is removed from the string storage space by unwinding one coil at a time so that the string moves transverse to a direction defined by string withdrawal, wherein the transverse motion caused has a periodicity which is proportional to the length of string withdrawn; and
at least one string sensor positioned in the cartridge between the storage space and the string outlet, the at least one string sensor positioned to detect the transverse movement of the string, so that the sensor output varies with a frequency proportional to the rate string is withdrawn from the cartridge.

13. The airbag cushion deployment sensor of claim 12 wherein a structure is positioned within the cartridge that is arranged to cause a selected frictional engagement with the string.

14. The airbag cushion deployment sensor of claim 12 wherein the storage space is defined by a gap between at least one spool and portions of the cartridge, and wherein the coils are contained in the storage space positioned around the spool.

15. The airbag cushion deployment sensor of claim 14 wherein the at least one spool has a cylindrical shape and a cone extending from the spool, and wherein the string outlet is positioned above the cone, so that as string is drawn out of the outlet it rotates about the cone creating the transverse motion.

16. The airbag cushion deployment sensor of claim 15 wherein the at least one string sensor is comprised of a light source, and a light detector positioned so that as the string is drawn out of the outlet and rotates about the cone it periodically passes between the light source and the light detector.

17. The airbag cushion deployment sensor of claim 16 wherein a plurality of light sources are mounted within the cone and portions of the cone define openings which project light onto a plurality of light sensors mounted in second portions of the cartridge defining openings opposite the light sources.

18. The airbag cushion deployment sensor of claim 16 wherein a light path is established by means of reflectors between the light source and the light sensor so that as the string travels once about the cone the light path is interrupted a plurality of times.

19. The airbag cushion deployment sensor of claim 14 wherein there are two spools and the string is wrapped in figure-eight coils around both spools.

20. The airbag cushion deployment sensor of claim 12 wherein the at least one string sensor is comprised of a light source, and a light detector positioned so that as the string is drawn out of the outlet and caused to move transverse to the direction of string withdrawal, the transverse motion causes a light path between the light source and the light detector to be broken.

21. The airbag cushion deployment sensor of claim 12 wherein the light path is established by means of reflectors between the light source and the light sensor so that as the string moves transverse to the direction of string withdrawal, the light path is interrupted a plurality of times for each cycle of transverse motion.

22. An airbag cushion deployment sensor comprising:
a cartridge having portions defining an interior storage space;
portions of the cartridge which define a string outlet communicating with the interior storage space;
a spool fixed within the cartridge interior storage space;
a string stored in a coil encircling the spool, and having a first end which extends through the string outlet for connection to the airbag cushion;
at least one light source mounted to the cartridge; and
at least one light detector mounted to receive light from the at least one light source, the at least one light detector being positioned such that extraction of the string from the coil causes the string to only intermittently pass between the at least one light detector and the at least one light source and to thus generate a fluctuating signal corresponding to the speed of withdrawal of the string from the cartridge.

23. The airbag cushion deployment sensor of claim 22 wherein the spool has an edge which faces the string outlet, the edge being positioned so that the string engages the edge as the first end is extracted through the string outlet.

24. The airbag cushion deployment sensor of claim 23 wherein the at least one light source and the at least one light detector are mounted to the cartridge between the edge and the string outlet, and the at least one light detector is mounted to the cartridge opposite the at least one light source.

25. The airbag cushion deployment sensor of claim 22 further comprising a conical structure which projects from the spool towards the string outlet.

26. The airbag cushion deployment sensor of claim 25 further comprising a portions of the conical structure defining at least one hole extending between the at least one light source and the at least one light detector.

27. The airbag cushion deployment sensor of claim 22 wherein the spool comprises two cylinders fixed within the cartridge, and the coil extends about both of said cylinders in a figure-eight pattern.

28. The airbag cushion deployment sensor of claim 22 wherein a plurality of light sources are fixed to the cartridge, and a plurality of light detectors are fixed to the cartridge apposite the plurality of light sources such that each light detector detects the light from a single light source.

29. The airbag cushion deployment sensor of claim 22 wherein at least one mirror is fixed to the cartridge to receive light from the at least one light source and to direct said light to the at least one light sensor.

30. The airbag cushion deployment sensor of claim 22 wherein a single sensor is mounted to the spool, and wherein a plurality of light sources are mounted to the cartridge to direct light to said single sensor.

31. The airbag cushion deployment sensor of claim 22 wherein a single light source is mounted to the cartridge, and a single light sensor is mounted to the cartridge, and a plurality of mirrors are mounted to the cartridge spaced from the light source and the light sensor, such that light emitted by the light source is reflected off the plurality of mirrors to be detected by the light sensor.

32. A method of monitoring airbag deployment comprising the steps of:

deploying an airbag cushion having a string mounted to an interior surface of the airbag, wherein the string is drawn from a cartridge which does not move in response to the deploying airbag cushion;

drawing the string from the cartridge, wherein portions of the cartridge are arranged to cause the string passing through the cartridge to perform an oscillating motion at a frequency proportional to the rate at which the string is being withdrawn; and detecting the frequency of the oscillating motion and determining the rate at which string is being withdrawn.

33. The method of claim 32 further comprising the step of causing the string to be drawn over a structure within the cartridge so that the oscillating motion produces friction of sufficient magnitude to substantially overcome the momentum of the string already withdrawn so that when the airbag cushion contacts an object so as to greatly reduce the rate at which string is being withdrawn, the friction produced will substantially overcome the momentum of the string already withdrawn.

* * * * *